United States Patent [19]
Kimura et al.

[11] Patent Number: 6,008,950
[45] Date of Patent: Dec. 28, 1999

[54] PROJECTION LENS

[75] Inventors: Shunsuke Kimura, Nishinomiya; Masayuki Takahashi, Ibaraki, both of Japan

[73] Assignee: Matsushita Electric Industrial Co., Ltd., Osaka, Japan

[21] Appl. No.: 09/015,793

[22] Filed: Jan. 29, 1998

[30] Foreign Application Priority Data

Jan. 30, 1997 [JP] Japan ..................................... 9-016878

[51] Int. Cl.⁶ ....................................................... G02B 3/00
[52] U.S. Cl. ........................................... 359/651; 359/649
[58] Field of Search .................................... 359/649, 651, 359/650, 648

[56] References Cited

U.S. PATENT DOCUMENTS

| | | | |
|---|---|---|---|
| 4,767,199 | 8/1988 | Yamamoto et al. | 359/649 |
| 4,776,682 | 10/1988 | Hosoya | 359/759 |
| 4,792,218 | 12/1988 | Nakajima et al. | 359/649 |
| 5,066,113 | 11/1991 | Nakajima et al. | 359/649 |

FOREIGN PATENT DOCUMENTS

| | | |
|---|---|---|
| 62-94811 | 5/1987 | Japan . |
| 6-242372 | 9/1994 | Japan . |
| 07063987 | 3/1995 | Japan . |

*Primary Examiner*—Georgia Epps
*Assistant Examiner*—Suzanne Letendre
*Attorney, Agent, or Firm*—McDermott, Will & Emery

[57] ABSTRACT

A first lens group U1 having a positive optical power, a second lens group U2 having a negative optical power and a third lens group U3 having a negative optical power are disposed in the order from a screen end. For focusing action, the first lens group U1 and the second lens group U2 respectively move in a same direction for different quantities, while the third lens group U3 remains fixed. The aperture ratio of projection lens as a whole is 1:1.1, the magnification of projection is in a range of −0.025 to 0.100.

7 Claims, 5 Drawing Sheets

AST (MM)

FIG. 4(e)

AST (MM)

FIG. 4(c)

DIS(%)

FIG. 4(f)

DIS(%)

PROJECTION LENS

BACKGROUND OF THE INVENTION

The present invention relates to a projection lens, and more specifically to a projection lens for a video projector which projects on a screen an enlargement of a high-definition image appearing on a CRT.

In a 3-tube video projector, each of the images in Red, Blue and Green colors, appearing on three respective monochrome CRTs is projected through a projection lens to form a color image on a screen. For projecting a high-definition image such as an image of high-grade television broadcasting system, the projection lens is required to be corrected with the chromatic aberration, and aspheric plastic lens, etc. are often used in order to further reduce residual aberrations.

The chromatic aberration is normally corrected via the use of a combination of a convex lens and a concave lens. This is based on the fact that both the convex and concave lenses carry with them the chromatic aberrations but the direction of generating the chromatic aberration is opposite to each other in the convex lens and the concave lens.

Figure 5:
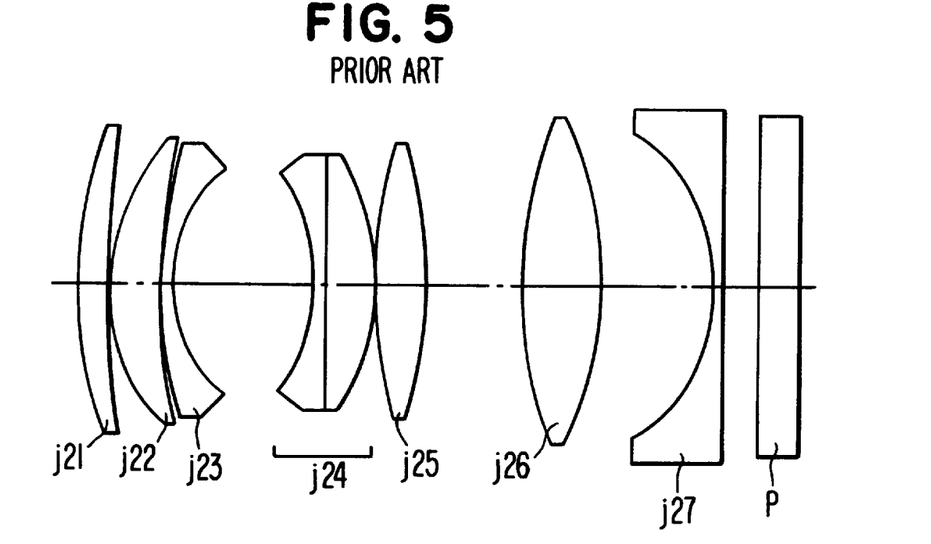
FIG. 5 and FIG. 6 are sectional views showing structures of prior art projection lenses.

Examples of such a projection lens is disclosed in, for example, U.S. Pat. Nos. 4,767,199 and 4,792,218. The projection lens of U.S. Pat. No. 4,767,199 comprises, as shown in FIG. 5, a first lens unit j21—a fifth lens unit j25 forming a modified Gauss-type lens system, plus a sixth lens unit j26 having a positive optical power (i.e converges or collects light) and a seventh lens unit j27 having a negative optical power (i.e., disperses or spreads light) for an enhanced aberration correction. By setting certain conditions upon the relationship among the first lens unit j21—fifth lens unit j25, the sixth lens unit j26 and the seventh lens unit j27, a projection lens having a large aperture ratio having high performance is implementable.

Figure 6:
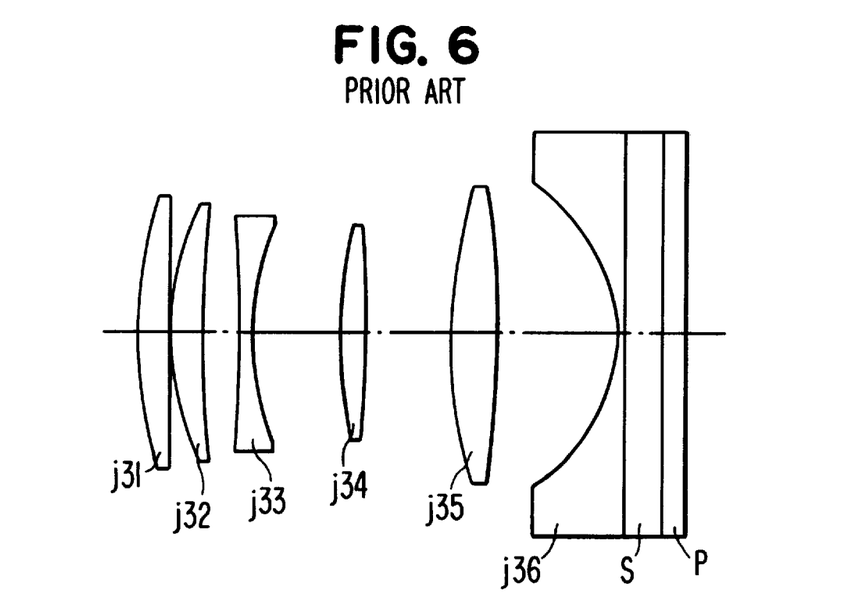

Meanwhile, a projection lens for high definition TV disclosed by the U.S. Pat. No. 4,792,218 comprises, as shown in FIG. 6, a first lens unit j31, a second lens unit j32, a third lens unit j33 and a fourth lens unit j34 forming an Ernostar-type lens system, plus a fifth lens unit j35 having a positive optical power and a sixth lens unit j36 having a negative optical power for an enhanced aberration correction capability By setting certain conditions upon the relationship in the focal length etc. between each of the lens units, a projection lens of large aperture ratio having high performance is implementable.

In the projection lens for projectors requiring a high contrast image, a space between the last lens unit j36 and the CRT face plate P is filled with an optical transparent medium S for optically coupling the two units. The contrast of an image is improved by the effect of OC (Optical coupling).

The size of an image projected on a screen is normally modified by changing the magnification of projection by changing the distance of projection.

In the prior art projection lens, however, when a projection distance is changed, the quantity of variation in the aberration goes beyond an allowable range for a CRT projector; this means the available range of magnification of projection is narrowed. As described above, a drawback with the prior art high-definition projection lens is that it is usable only within a certain range of magnification of projection not deviating much from the optical design center.

The reasons why the above drawbacks arise includes the following:

(1) The current CRT projectors are expected to meet the requirements for high-definition and high-resolution. In a projector for computer application, among others, characters need to be shown with high-resolution even at the edge of a screen. As such, residual aberrations in each on the lenses must be suppressed as small as possible; in order to make this happen, the variation of aberration brought about by the change in magnification of projection must be suppressed to a minimum.

(2) In order to secure sufficient brightness of an image on screen, a CRT projector has to have a fast projection lens whose value ½ sin (a) (hereinafter referred to as the F number) is about 1; where "a" is ½ the angle of the focal point against the diameter of entrance pupil in an optical system within a medium of refraction index n. However, in the large aperture ratio the depth of field is shallow, and because of the large incoming angle of the beam, a significant aberration variation is induced by the change of the incoming angle caused as a result of modified magnification of projection. The modification in magnification of projection is therefore limited.

Furthermore, there is another drawback in the Optically Coupled projection lens as described above in that it is difficult for the lens to perform focusing action by moving the entire group of lens units forward with the gaps between lens units being invariable. In order to move the entire lens group for focusing in the OC projection lens, thickness of the transparent optical medium needs to be made variable; in this case a countermeasure also has to be taken against possible leakage of the medium. Because of the reasons described above, conventional OC projection lenses conduct the focusing action, not by forwarding the entire lens units, but by changing the distance of an air gap between the last lens group working as the field flattener and a group of lens units assembled in a barrel located in the front (i.e., closer to screen). The field flattener of the OC projection lens is located low with respect to the optical axis; therefore, the effect of correcting the aberration variation remains small for the modification in the distance of the air gap against the group of lens units located in the front. The deterioration in the optical performance is more significant in the above described conventional focusing method as compared with the focusing by forwarding of the entire lens units.

SUMMARY OF THE INVENTION

It is an object of the present invention to present an OC (Optically Coupled) type projection lens which provides a high-contrast image, and which has wide range of available magnification of projection.

A projection lens in accordance with the present invention comprises three or more of lens groups, each group being made of one or more of lens units; wherein two out of the three or more of lens groups move independently from one another for focusing, the aperture ratio of projection lens as a whole is 1:1.1, a range of magnification of projection of the projection lens as a whole is in a range −0.025 to −0.100.

A projection lens having the above structure, in which two lens groups move independently from one another, provides a range of magnification index which is greater than that of the conventional structure in which one lens group moves for focusing.

A projection lens in accordance with an exemplary first embodiment of the present invention comprises, in the order from screen end, a first lens group having a positive optical power, a second lens group having a negative optical power and a third lens group having a negative optical power; for focusing action, said third lens group being fixed, whereas said first lens group and second lens group respectively move in a same direction for different quantities of transfer (i.e., the distance the lens group has moved), the ratio of the focal length of said first lens group against that of the overall projection lens falling within a range 0.7 to 0.8 (condition (1) ), the ratio of the focal length of said second lens group against that of the overall projection lens falling within a range −3.3 to −3.1 (Condition (2) ), and the ratio of the focal length of said third lens group against that of the overall projection lens falling within a range −1.2 to −1.0 (Condition (3) ).

Condition (1) sets a condition for specifying the focal length of the first lens group. If the focal length of the first lens group becomes larger than that specified by Condition (1), the quantity of transfer of the first lens group at focusing becomes too large thereby affecting the focusing performance and ease of operation. If the focal length of the first lens group is smaller than that specified by Condition (1), the aberration correction becomes more difficult.

Condition (2) sets a condition for specifying the focal length of the second lens group. If the focal length is negative and larger than that specified by Condition (2), the quantity of correction at focusing becomes smaller. If the focal length is negative and smaller than that specified by Condition (2), the quantity of correction at focusing becomes large inviting an over correction.

Condition (3) sets a condition for specifying the focal length of the third lens group. If the focal length becomes larger than that specified by Condition (3), the quantity of aberration variation at focusing becomes too large affecting the focusing performance. If the focal length is smaller than that specified by Condition (3), the Petzval sum becomes uncorrectable making the correction of the curvature of field more difficult.

A projection lens in accordance with a second exemplary embodiment of the present invention comprises, in the order from the screen end, a first lens group having a positive optical power, a second lens group having a positive optical power, and a third lens group having a negative optical power; wherein during focusing said third lens group stays fixed, whereas said first lens group and second lens group respectively move in the same direction for different quantities of transfer, the ratio of the focal length of said first lens group against that of the overall projection lens falling within a range 1.1 to 1.2 (Condition (8) ), the ratio of the focal length of said second lens group against that of the overall projection lens falling within a range 2.2 to 2.4 (Condition (9) ), and the ratio of the focal length of said third lens group against that of the overall projection lens falling within a range −1.2 to −1.1 (Condition (10) ).

As such, Condition (8) sets a condition for specifying the focal length of the first lens group. If the focal length becomes larger than that specified by Condition (8), the quantity of transfer of first lens group for focusing becomes too large, thereby affecting the focusing performance and ease of operation. If the focal length is smaller than that specified by Condition (8), the aberration correction becomes more difficult.

Condition (9) sets a condition for specifying the focal length of the second lens group If the focal length is negative and larger than that specified by Condition (9), the quantity of correction at focusing becomes smaller. If the focal length is negative and smaller than that specified by Condition (9), the quantity of correction at focusing becomes large inviting an over correction.

Condition (10) sets a condition for specifying the focal length of the third lens group. If the focal length becomes larger than that specified by condition (10), the quantity of aberration variation at focusing becomes too large affecting the focusing performance. If the focal length is smaller than that specified by condition (10), the Petzval sum becomes uncorrectable making the correction of the curvature of the field more difficult.

BRIEF DESCRIPTION OF THE DRAWINGS

FIG. 2(a)–FIG. 2(f) are aberration charts for the projection lens of the first embodiment.

FIG. 4(a)–FIG. 4(f) are aberration charts for the projection lens of the second embodiment.

DESCRIPTION OF THE PREFERRED EMBODIMENTS

A projection lens in accordance with the present invention comprises a first lens group U1, a second lens group U2 and a third lens group U3, where the third lens group U3 is a field flattener. The lens groups U1, U2 and U3 being disposed in the order from screen end. In order to make the range of available magnification of projection larger, it is essential that the variation of aberration, which is induced by the modification of projection distance for changing the magnification of projected image, is suppressed at any stage of the projection magnification index.

When an OC lens is used for high magnification index at a projection distance shorter than the center value of the designed distance, focusing is conducted by expanding an air gap between the field flattener U3 and the second lens group U2 located before the field flattener U3. Thus, when a projection lens is utilized at a distance shorter than the center value of designed distance, the height of a beam passing through the field flattener U3 becomes low relative to the optical axis, and the quantity of spherical aberration correction becomes smaller than that taken into account at lens designing. As a result, beams focusing at the center of an image shifts from the design center towards the anti-screen end (hereinafter referred to as under side).

There are two ways of correcting the aberration; namely, the first is reducing the generation of the aberration itself, the second is to combine an aberration with another aberration in the opposite direction, which is generated by another lens unit.

The quantity of aberration can be reduced by making the reciprocal of the focal length (hereinafter referred to as power) of the U3 lens, the field flattener, smaller. In addition, the residual aberrations may be set off by an aberration of opposite direction generated as a result of the transfer of the other lens groups U1 and U2.

What is to be considered first is to suppress the variation of spherical aberration accompanied by focusing action, because it is impossible to correct other aberrations unless the spherical aberration is corrected in the first place. The shift of spherical aberration is brought about as a result of the lowered height of a beam passing through the field flattener U3 relative to the optical axis. Therefore, the spherical aberration is variable by the change in the height of the beam passing through the field flattener U3 relative to the optical axis, which is brought about as a result of the transfer of other lens groups U1 and U2.

The projection lens of the present invention is based on a telescopic concept, and there are two categories; the first in which the lens group U1, corresponding to the front lens group in a telescope, has a positive power, the lens group U2, corresponding to the rear lens group, has a negative power, and behind the telescopic structure a field flattener U3 is added for correcting the Petzval sum and the distortion, and the second in which the lens group U1, corresponding to the front lens group in a telescope, has a positive power, the lens group U2, corresponding to the rear lens group, has a positive power too, and behind the telescopic structure a field flattener U3 is added for correcting the Petzval sum and the distortion. As the beams pass in a direction converging towards the optical axis in the gap between the front group U1 and the rear group U2 of the telescopic structure, the spherical aberration is varied by the shift of beam height in field flattener U3 relative to the optical axis which is brought about as a result of the transfer of the interplane spacing at focusing. Interplane spacing refers to the distance between an edge of a first lens to an edge of a second lens, as well as the distance between a first edge of a lens and a second edge of the same lens.

As described in the above, two lens groups among the three lens groups of a projection lens are movable respective to one another and the third Lens group for focusing in the projection lens of the present invention. As a result of the present invention, spherical aberration and other aberrations are correctable, such that the projection lens has an aperture ratio of 1:1.1, and magnification of projection in a range −0.025 to −0.100.

Examples of the projection lens of the present invention are described below.

EMBODIMENT 1

Figure 1:
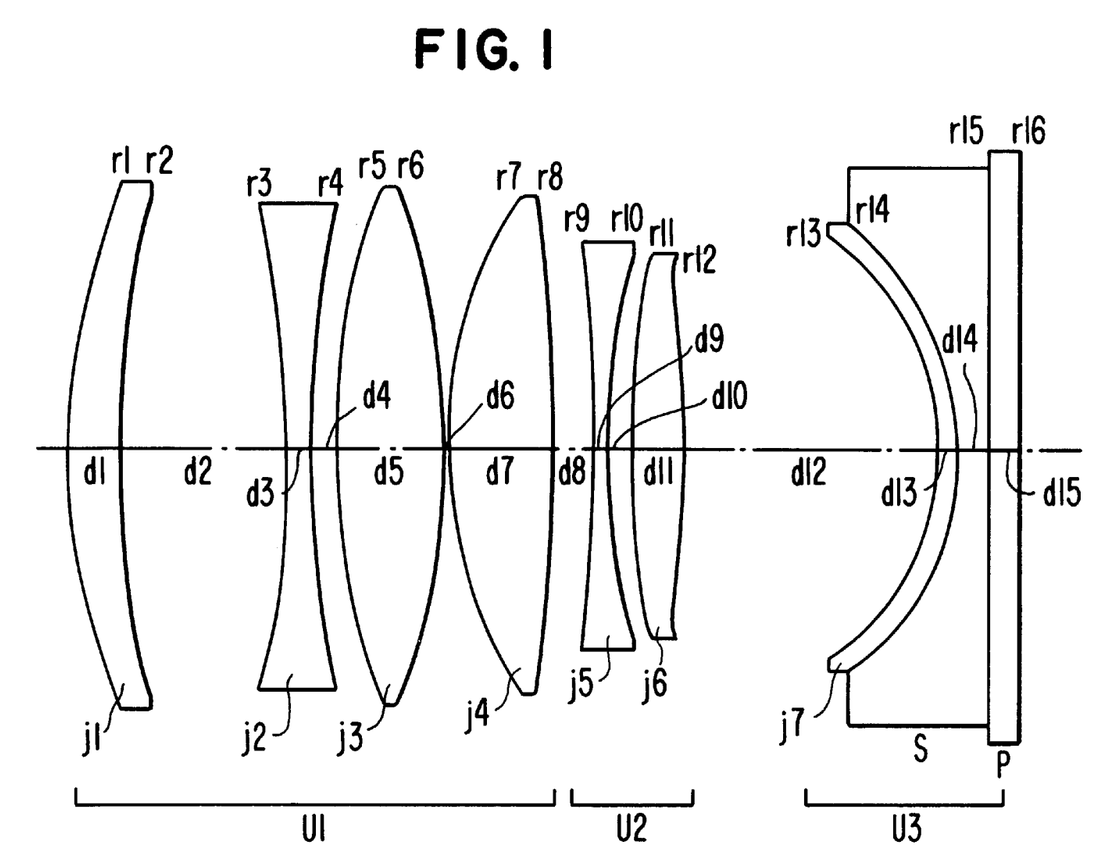
FIG. 1 is a sectional view showing a structure of a projection lens in accordance with an exemplary first embodiment of the present invention.

In FIG. 1, a first lens group U1, a second lens group U2 and a third lens group U3 are disposed in the order from screen end (left side in the FIG.) towards the anti-screen end (right side).

The first lens group U1 allows a quantity of light to pass through the lens unit such that the F number is approximately 0.94. The first lens group U1 comprises four types of lens units, namely, a first aspheric lens unit j1 having a positive power, a second lens unit j2 having a negative power, a third lens unit j3 having a positive power, and a fourth lens unit j4 having a positive power. The overall first lens group U1 has a positive power. As shown, the lens units j1, j2, j3 and j4 are disposed in the order from the screen end towards the anti-screen end. The first lens group U1 is movable by a known first transfer means (not shown) on an axis line in a direction towards and away from the screen end, and the anti-screen end.

The second lens group U2 allows a quantity of light to pass through the lens unit such that the F number is approximately 6.5. The second lens group U2 comprises two types of lens units, namely, a fifth lens unit j5 having a negative power, and a sixth aspheric lens unit j6 having a positive power. The overall second lens group has a negative power. As shown, the lens units j5 and j6 are disposed in the order from the screen end towards the anti-screen end. The second lens group U2 is movable by a known second transfer means (not shown) on a same axis line in the direction of the screen end and the anti-screen end.

The aberrations in each of the first and the second lens groups are corrected; in the under side for the first lens group U1 and the second lens group U2 together, in the under side for the first lens group, and in the over side for the second lens group U2.

The third lens group U3 is a field flattener for correcting the Petzval sum and the distortion, and has a negative power as a whole. The third lens group U3 comprises a seventh aspheric lens unit j7 having a negative power disposed at the screen end, a CRT face plate P disposed at the anti-screen end. A space between the seventh lens unit j7 and face plate P is filled with a transparent optical medium S to make an OC group. The third lens group U3 is fixed to body of the projection lens by means of face plate P.

The first lens group U1 and the second lens group U2 are structured to have a focal length satisfying the following conditions;

$$f1n/f1 = -1.81$$

$$f2n/f2 = 0.39$$

where; f1n: Focal length of the negative lens unit in the first lens group f1: Focal length of the first lens group f2n: Focal length of the negative lens unit in the second lens group f2: Focal length of the second lens group The aspheric lens unit in second lens group U2 and the aspheric lens unit in third lens group U3 are plastic lenses having a focal length satisfying the following conditions:

$$f6pr/f7pr = -1.97$$

where; f6pr: Focal length of the aspherical plastic lens in second lens group f7pr: Focal length of the aspherical plastic lens in third lens group Each of the lens units constituting the lens groups is disposed on a same axial line In FIG. 1, symbol ri represents the radius of curvature of a lens surface in the order from the screen end, di is an interplane spacing between the surface i and the succeeding surface on the optical axis.

In the first exemplary embodiment, the magnification of projection is −0.068 and −0.096, and the refractive index ni at line d of the lens unit j Abbe's number vi are shown in Table 1.

TABLE 1

| Surface radius (mm) | Interplane distance axis direction (mm) | Nd | vd |
|---|---|---|---|
| r1 = 175.508 | d1 = 16.3 | n1 = 1.49178 | v1 = 57.2 |
| r2 = 378.255 | d2 = 49.8 | | |

TABLE 1-continued

| Surface radius (mm) | Interplane distance axis direction (mm) | Nd | νd |
|---|---|---|---|
| r3 = −389.500 | d3 = 8.0 | n2 = 1.75520 | ν2 = 27.5 |
| r4 = 310.840 | d4 = 8.0 | | |
| r5 = 217.970 | d5 = 30.5 | n3 = 1.58913 | ν3 = 61.2 |
| r6 = −254.348 | d6 = 1.2 | | |
| r7 = 135.862 | d7 = 31.5 | n4 = 1.70000 | ν4 = 48.0 |
| r8 = −496.125 | d8 = focus 1 | | |
| r9 = −551.921 | d9 = 5.8 | n5 = 1.75520 | ν5 = 27.5 |
| r10 = 216.662 | d10 = 7.0 | | |
| r11 = 653.991 | d11 = 16.1 | n6 = 1.49178 | ν6 = 57.2 |
| r12 = −239.522 | d12 = focus 2 | | |
| r13 = −79.754 | d13 = 5.0 | n7 = 1.49178 | ν7 = 57.2 |
| r14 = −86.000 | d14 = 10.0 | n8 = 1.43500 | ν8 = 50.7 |
| r15 = α | d15 = 10.3 | n9 = 1.54040 | ν9 = 50.7 |
| r16 = α | | | |

| Magnification of projection | Focus 1 | Focus 2 |
|---|---|---|
| −0.068 | 13.7 | 78.8 |
| −0.096 | 12.9 | 83.8 |

In an aspheric lens, the quantity of displacement S from the summit of the lens in an aperture at radial distance h from the optical axis represented by the following formula:

$$S = \frac{h^2/r}{1 + [1 - (h/r)^2]^{1/2}} + \sum_{i=3} ai - h^i$$

where: ai represents the aspherical coefficient in the power of i

The aspherical coefficient at each surface of the respective aspheric lens units is shown below:

(First lens unit j1)

(First surface aspherical coefficient)
a 3 = −5.38450 × $10^{-6}$
a 4 = −2.92427 × $10^{-7}$
a 5 = 5.01298 × $10^{-9}$
a 6 = −3.58064 × $10^{-11}$
a 7 = −3.18962 × $10^{-13}$
a 8 = 4.43956 × $10^{-15}$
a 9 = 0.0
a10 = −1.19903 × $10^{-19}$ (Second surface aspherical coefficient)
a 3 = −9.04446 × $10^{-7}$
a 4 = −1.58899 × $10^{-8}$
a 5 = 9.55655 × $10^{-10}$
a 6 = 1.03112 × $10^{-12}$
a 7 = −2.95845 × $10^{-13}$
a 8 = 3.30931 × $10^{-15}$
a 9 = 0.0
a10 = −3.87495 × $10^{-20}$ (Sixth lens unit j6)

(Eleventh surface aspherical coefficient)
a 3 = 7.70136 × $10^{-6}$
a 4 = −5.30520 × $10^{-7}$
a 5 = 1.36300 × $10^{-8}$
a 6 = 1.06075 × $10^{-11}$
a 7 = −4.71884 × $10^{-12}$
a 8 = 8.38768 × $10^{-14}$
a 9 = 0.0
a10 = −4.67935 × $10^{-18}$ (Twelfth surface aspherical coefficient)
a 3 = 3.55157 × $10^{-6}$
a 4 = −2.65228 × $10^{-7}$
a 5 = 2.01761 × $10^{-8}$
a 6 = −3.71303 × $10^{-10}$
a 7 = 2.22372 × $10^{-12}$
a 8 = 3.60618 × $10^{-14}$
a 9 = 0.0
a10 = −3.60478 × $10^{-18}$ (Seventh lens unit j7)

(Thirteenth surface aspherical coefficient)
a 3 = −8.57635 × $10^{-5}$
a 4 = 3.70918 × $10^{-6}$
a 5 = −5.91359 × $10^{-8}$
a 6 = 9.09605 × $10^{-11}$
a 7 = 5.04078 × $10^{-12}$
a 8 = −1.11683 × $10^{-14}$
a 9 = 0.0
a10 = −3.46639 × $10^{-18}$ Now in the following, the operation of each of the lens groups in the first exemplary embodiment is described.

When focusing a projection lens at a short projection distance, first lens group U1 is transferred by a first transfer means away from the field flattener U3 towards the screen end, second lens group U2 is also transferred by a second transfer means towards the screen end so as to be closer to the first lens group U1.

The second lens group U2 is designed to hove faster than the first lens group U1, therefore when both the first lens group U1 and the second lens group U2 are moved at once the second lens group U2 is transferred faster than first lens group U1, making the interplane spacing between the first and the second lens groups smaller.

The first lens group U1 and the second lens group U2 are moved so that the focal length of each lens group fulfill the following conditions:

f1/f0 = 0.764
f2/f0 = −3.205
f3/f0 = −1.115 where;
  f0: Focal length of the overall projection lens system
  f1: Focal length of the first lens group
  f2: Focal length of the second lens group
  f3: Focal length of the third lens group The first lens group U1 and the second lens group U2 are moved so as to satisfy the following conditions:

Δd12/Δd23=−0.16 where;
  Δd12: Quantity of transfer of air gap between first lens group and second lens group; Δd12=d8 (at the magnification of −0.068) −d8' (at the magnification of −0.096)
  Δd23: Quantity of transfer of air gap between second lens group and third lens group; Δd23=d12 (at the magnification of −0.068−d12' (at the magnification of −0.096)

The focusing of a projection lens in accordance with the first exemplary embodiment is conducted by moving the first lens group having a positive power and the second lens group having a negative power, respectively, while fixing the third lens group, and establishing certain specific conditions on each of the lenses.

Figure 2A:
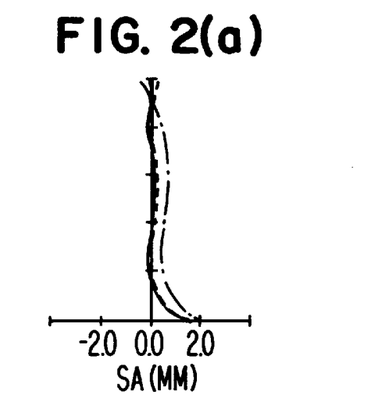
FIG. 2(a), FIG. 2(b) and FIG. 2(c), respectively, show the spherical aberration, the astigmatism and the distortion at a projection magnification index of −0.067, FIG. 2(d), FIG. 2(e) and FIG. 2(f), respectively, show the spherical aberration, the astigmatism and the distortion at a projection magnification index of −0.097.
Figure 2B:
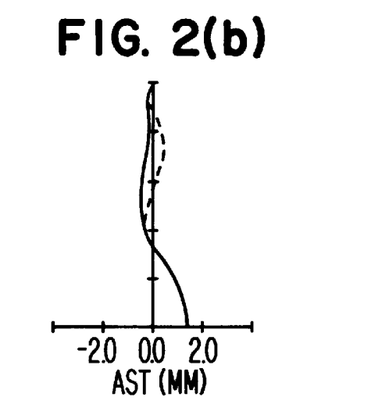
Figure 2C:
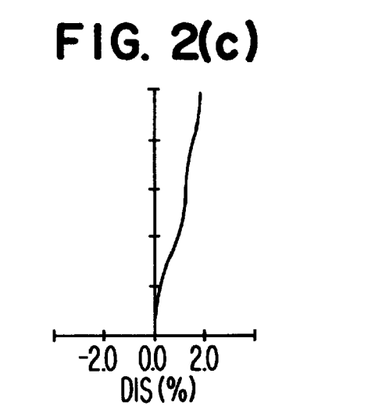

FIG. 2(a), FIG. 2(b) and FIG. 2(c), respectively, show the spherical aberration, the astigmatism and the distortion in the first embodiment at the magnification of projection of −0.067.

Figure 2D:
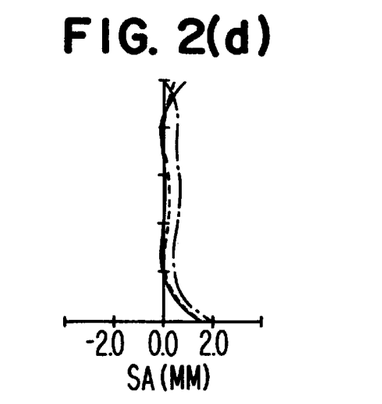
Figure 2E:
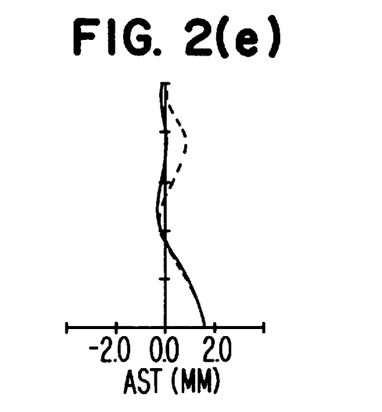
Figure 2F:
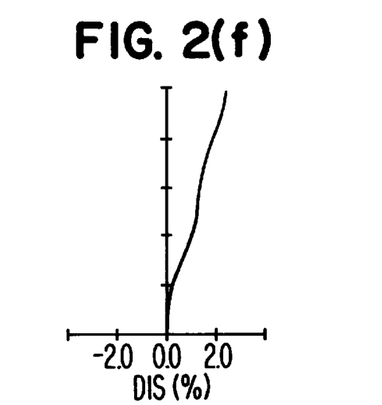

FIG. 2(d), FIG. 2(e) and FIG. 2(f), respectively, show the spherical aberration, the astigmatism and the distortion in the first embodiment at the magnification of projection of −0.097. In the charts illustrating spherical aberration, the solid line represents the aberration with the e line, the chained line is the g line, the dotted line is the C line, and the coarse dotted line is the f line. In the astigmatism charts, the solid line represents aberration of sagittal(S) directions and the dotted line is that of meridional(M) direction. In addition, the focal length is 163 mm, the F number is 1.1, and the half-picture angle is 26 degrees.

As described above, because the height of the beams passing through the field flattener U3 is changed in the projection lens of the first embodiment relative to the optical axis at focusing Action, by changing a gap between the first lens group U1 and the second lens group U2 where beams are in a converging direction, the spherical aberration can be effectively corrected. As a result, the lines of FIG. 2 representing various aberrations do not deviate much from the vertical axis of the coordinate, the form or aberration does not change significantly even when aberration varies at focusing. Thus the aberrations are favorably corrected by the present invention, and a range of available magnification of projection can be made broader.

EMBODIMENT 2

Figure 3:
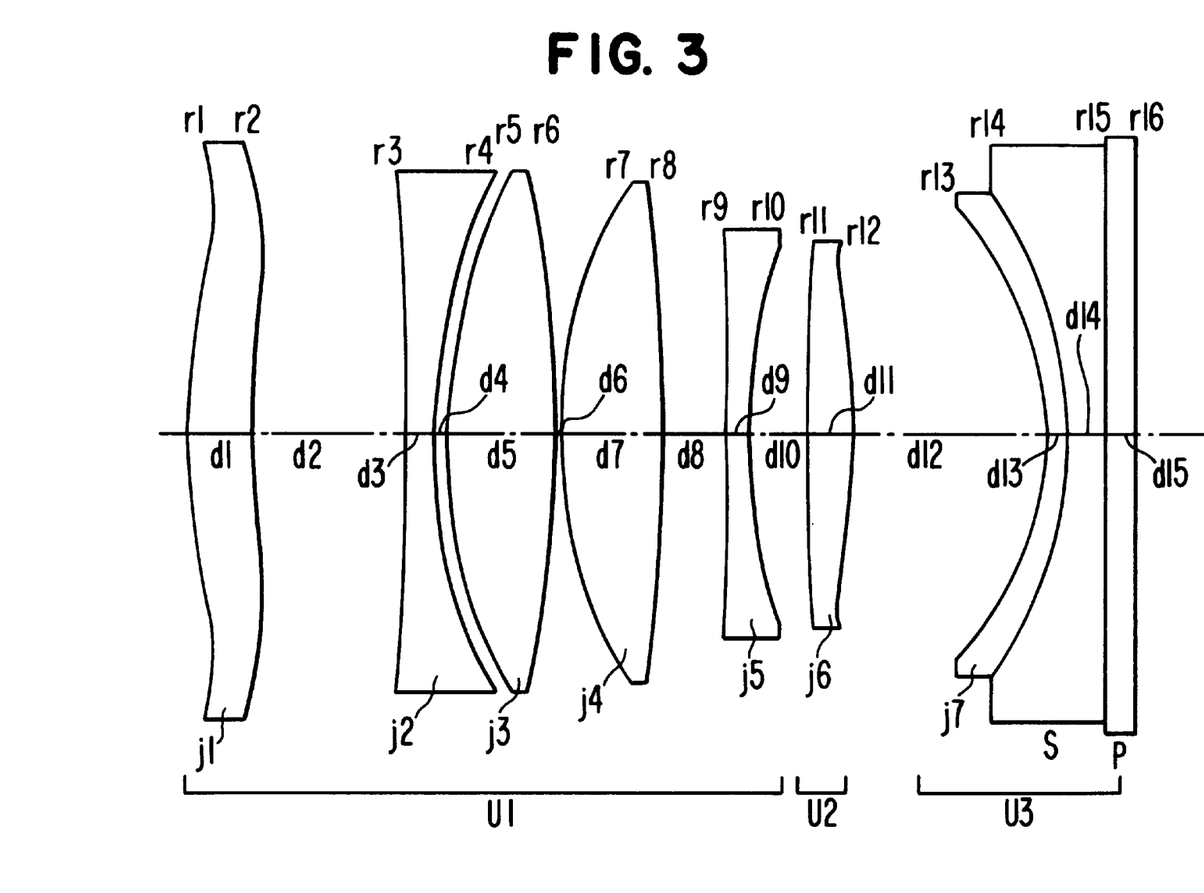
FIG. 3 is a sectional view showing a structure of a projection lens in accordance with a second exemplary embodiment of the present invention.

FIG. 3 illustrates a second embodiment of the present invention. As shown in FIG. 3, a first lens group U1, a second lens unit group U2 and a third lens group U3 are disposed in the order from the screen end towards the anti-screen end, in the same way as in the first embodiment.

The first lens group U1 a quantity of light to pass through the lens unit such that the F number is approximately 1.3, and comprises five types of lens units, namely, a first aspheric lens unit j1 hating a positive power, a second lens unit j2 having a negative power, a third lens unit j3 having a positive power, a fourth lens unit j4 having a positive power, and a fifth lens unit j5 having a negative power. The overall first lens group has a positive power. As shown, the lens units j1, j2, j3, j4 and j5 are disposed in the order from the screen end towards the anti-screen end.

The second lens unit group U2 allows a quantity of light to pass through the lens unit such that the F number is approximately 3.8, and comprises an aspheric lens unit j6 having a positive power.

The remaining structures of the projection lens of the second embodiment are the same as those of the first embodiment, so description therefor is omitted here The symbols ri, di, ni, and i respectively represent the same content as in Embodiment 1.

In the second exemplary embodiment, the magnification of projection is −0.068 and −0.097, and the refractive index ni at line d of the lens unit j, Abbe's number vi are as shown in Table 2.

TABLE 2

| Surface radius (mm) | Interplane distance axis direction (mm) | Nd | vd |
|---|---|---|---|
| r1 = 195.104 | d1 = 19.9 | n1 = 1.49178 | v1 = 57.2 |
| r2 = 616.938 | d2 = 45.6 | | |
| r3 = −959.556 | d3 = 8.0 | n2 = 1.75520 | v2 = 27.5 |
| r4 = 158.213 | d4 = 5.7 | | |
| r5 = 202.056 | d5 = 31.0 | n3 = 1.70000 | v3 = 48.0 |

TABLE 2-continued

| Surface radius (mm) | Interplane distance axis direction (mm) | Nd | vd |
|---|---|---|---|
| r6 = −278.281 | d6 = 1.0 | | |
| r7 = 151.729 | d7 = 31.0 | n4 = 1.70000 | v4 = 48.0 |
| r8 = −341.064 | d8 = 20.0 | | |
| r9 = −3303.685 | d9 = 7.0 | n5 = 1.75520 | v5 = 27.5 |
| r10 = 177.840 | d10 = focus 1 | | |
| r11 = −786.972 | d11 = 14.0 | n6 = 1.49178 | v6 = 57.2 |
| r12 = −149.950 | d12 = focus 2 | | |
| r13 = −78.399 | d13 = 6.0 | n7 = 1.49178 | v7 = 57.2 |
| r14 = −120.000 | d14 = 12.0 | n8 = 1.43500 | v8 = 50.7 |
| r15 = α | d15 = 10.3 | n9 = 1.54040 | v9 = 50.7 |
| r16 = α | | | |

| Magnification of projection | Focus 1 | Focus 2 |
|---|---|---|
| −0.068 | 18.0 | 59.94 |
| −0.097 | 19.13 | 63.04 |

In an aspheric lens, the quantity of displacement S from the summit of the lens in an aperture at radial distance h from the option axis is represented by the following formula:

$$S = \frac{h^2/r}{1 + [1 - (h/r)^2]^{1/2}} + \sum_{i=3} ai - h^i$$

where: ai represents the aspherical coefficient in the power of i.

The aspherical coefficient at each surface of the respective aspheric lens units is shown below:

(First lens unit j1)

(First surface aspherical coefficient)
        a 3 = 8.26587 × 10$^{-6}$
        a 4 = −5.41648 × 10$^{-7}$
        a 5 = 7.57695 × 10$^{-9}$
        a 6 = −6.14213 × 10$^{-11}$
        a 7 = −7.52283 × 10$^{-13}$
        a 8 = 7.31778 × 10$^{-15}$
        a 9 = 0.0
        a10 = −9.33172 × 10$^{-20}$
    (Second surface aspherical coefficient)
        a 3 = −2.17241 × 10$^{-6}$
        a 4 = −5.81958 × 10$^{-8}$
        a 5 = 2.82413 × 10$^{-11}$
        a 6 = −1.47632 × 10$^{-11}$
        a 7 = −3.44057 × 10$^{-13}$
        a 8 = 2.81976 × 10$^{-15}$
        a 9 = 0.0
        a10 = 6.85815 × 10$^{-21}$
(Sixth lens unit j6)

(Eleventh surface aspherical coefficient)
        a 3 = −1.33623 × 10$^{-5}$
        a 4 = 4.45850 × 10$^{-7}$
        a 5 = −2.35749 × 10$^{-9}$
        a 6 = −6.83115 × 10$^{-11}$
        a 7 = −5.16823 × 10$^{-12}$
        a 8 = 1.73515 × 10$^{-13}$
        a 9 = 0.0
        a10 = −1.12704 × 10$^{-17}$
    (Twelfth surface aspherical coefficient)
        a 3 = 1.24308 × 10$^{-5}$
        a 4 = −6.30842 × 10$^{-7}$
        a 5 = 2.68811 × 10$^{-8}$ -continued

```
        a 6 = −5.37823 × 10⁻¹⁰
        a 7 = 5.31444 × 10⁻¹²
        a 8 = 9.38806 × 10⁻¹⁵
        a 9 = 0.0
        a10 = −6.51266 × 10⁻¹⁸
(Seventh lens unit j7)

(Thirteenth surface aspherical coefficient)
        a 3 = 0.0
        a 4 = 1.28842 × 10⁻⁷
        a 5 = 0.0
        a 6 = 1.47744 × 10⁻¹⁰
        a 7 = 0.0
        a 8 = −4.06661 × 10⁻¹⁴
        a 9 = 0.0
        a10 = 5.70312 × 10⁻¹⁸
```

Now in the following, the operation of each of the lens groups in the second exemplary embodiment is described.

When focusing a projection lens at a short projection distance, the first lens group U1 is transferred by a first transfer means away from the field flattener U3 towards the screen end, the second lens unit group U2 having a positive power is also transferred by a second transfer means away from the field flattener U3 towards the screen end.

The second lens unit group U2 is designed to move slower than the first lens group U1, therefore when both the first lens group U1 and the second lens unit group U2 are moved at once the first lens group U1 is transferred faster than second lens unit group U2, making the interplane spacing between the first and the second lens groups larger.

The first lens group U1 and the second lens unit group U2 are moved so that the focal length of each lens group satisfies the following conditions:

$$f1/f0=1.15$$

$$f2/f0=2.29$$

$$f3/f0=-1.05$$

The first lens group U1 and the second lens unit group U2 are moved so as to satisfy the following conditions in the quantity of transfer:

$$\Delta d12/\Delta d23=0.37$$

Figure 4A:
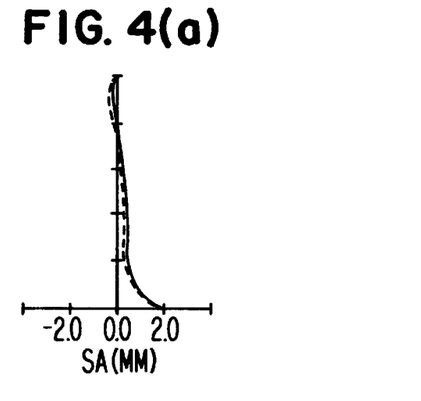
FIG. 4(a), FIG. 4(b) and FIG. 4(c), respectively, show the spherical aberration, the astigmatism and the distortion at a projection magnification index of −0.068, FIG. 4(d), FIG. 4(e) and FIG. 4(f), respectively, show the spherical aberration, the astigmatism and the distortion at a projection magnification index of −0.09.
Figure 4B:
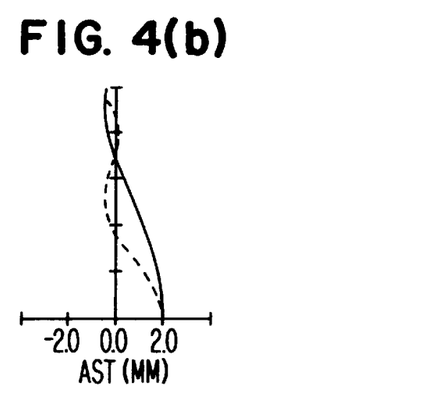
Figure 4C:
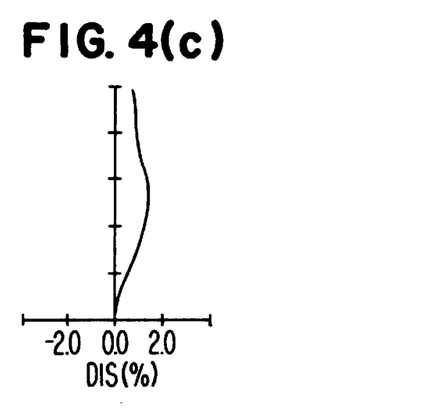
Figure 4D:
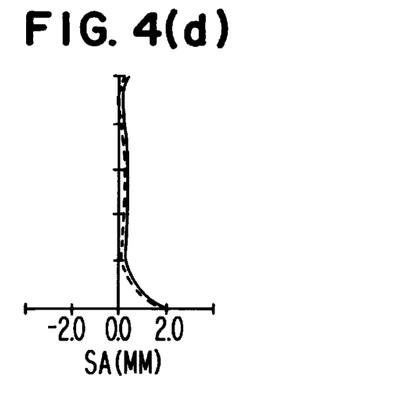
Figure 4E:
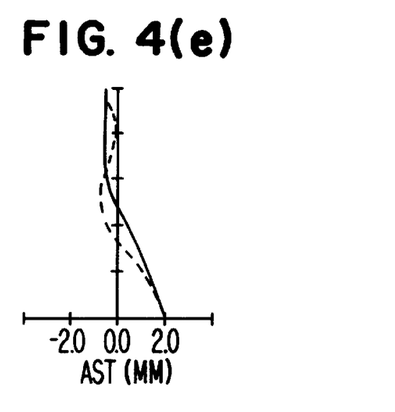
Figure 4F:
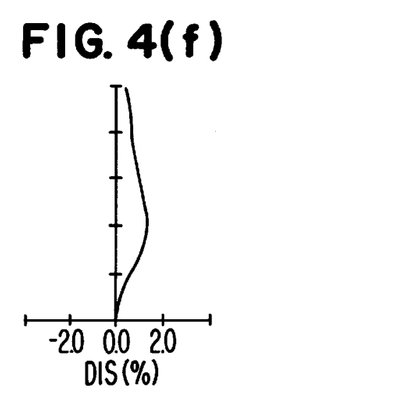

The focusing of a projection lens in accordance with the second exemplary embodiment is conducted by moving the first lens group U1 having a positive power and the second lens unit group U2 having a positive power respectively, while fixing the third lens group U3; as a result, the interplane spacing between first lens group and second lens unit group is enlarged, the interplane spacing between second lens unit group and third lens group is also enlarged, establishing certain specific conditions on each of the lenses. FIG. 4(a), FIG. 4(b) and FIG. 4(c), respectively, show the spherical aberration, the astigmatism and the distortion in the second embodiment at the magnification of projection of −0.068. FIG. 4(d), FIG. 4(e) and FIG. 4(f), respectively, show the spherical aberration, the astigmatism and the distortion in the second embodiment at the magnification of projection of −0.97. In addition, the focal length is 163 mm, the F number is 1.1, and the half-picture angle is 26 degrees.

As described above, because the height of beam passing through the field flattener U3 is changed in the projection lens of the second embodiment relative to the optical axis at focusing action, by changing a gap between the first lens group U1 and the second lens unit, group U2 where beams are in a converging direction, the spherical aberration can be effectively corrected. As a result, the lines in FIG. 4 representing various aberrations do not deviate much from the vertical axis of the coordinate, the form of aberration does not change significantly even if aberration varies at focusing Thus, the aberrations are favorably corrected, and a range of available magnification of projection can be made broader.

It is to be understood the above described exemplary embodiments are not intended to limit the present invention. For example, in the first exemplary embodiment, a projection lens is structured based on the focal lengths of lens groups U1, U2 and U3, respectively, f1/f0=0.764, f2/f0=−3.205, f3/f0=−1.115. However, a projection lens can be structured otherwise, in which it preferably satisfies following conditions (1) through (3)

$$0.7<f1/f0<0.8 \tag{1}$$

$$-3.3<f2/f0<-3.1 \tag{2}$$

$$-1.2<f3/f0<-1.0 \tag{3}$$

The foregoing structure of the projection lens of the first embodiment is also based on the quantity of transfer of the first lens group U1 and the second lens group U2,Δd12−Δd23=−0.16. However, a projection lens can be structured otherwise, in which it preferably satisfies following conditions (4):

$$-0.17\Delta d12/\Delta d23<-0.15 \tag{4}$$

where:

the conditions (4) specify the quantity of transfer of the first lens group and the second lens group at focusing; when it exceeds the range of the conditions (4) the spherical aberration is varied by focusing, by an over-correction when it is larger than the conditions (4), and by an under-correction when it. is smaller than the conditions (4)

Further, the foregoing structure of the projection lens of the first embodiment is also based on the focal lengths of the lens groups U1, U2, f1n/f1=−1.81, f2n/f2=0.39. However, it may be structured otherwise, in which it preferably satisfies following conditions (5) and (6):

$$-1.90<f1n/f1<-1.70 \tag{5}$$

$$0.38<f2n/f2<0.40 \tag{6}$$

The conditions (5) are for correcting the chromatic aberration, and the conditions (6), which are relevant to the chromatic aberrations of magnification, bring the first lens group to an under-correction of aberration, and the second lens group to an over-correction of aberration.

Furthermore, the aspheric lens unit of second lens group and the aspheric lens unit of third lens group comprise plastic lenses having a relationship in focal length, f6pr/f7pr=−1.97. It is preferred to satisfy the following conditions (7):

$$-2.07<f6pr/f7pr<-1.87 \tag{7}$$

The conditions (7) are for appropriately correcting the shift of the image plane caused by temperature change, and specify the relationship between the focal length of the aspheric lens unit of second lens group and the focal length of third lens group; if it exceeds a range of the conditions (7) the shift of the image plane, due to the temperature change becomes larger, resulting in a dislocated focusing between the initial stage when an image first appeared on a CRT and the stage after the temperature of the CRT has risen.

In the second exemplary embodiment, a projection lens is structured based on the focal lengths of lens groups U1, U2 and U3, respectively, f1/f0=1.15, f2/f0–2.29, f3/f0=–1.05. However, a projection lens can be structured otherwise, in which it preferably satisfies following conditions (8) through (10):

$$1.1 < f1/f0 < 1.2 \quad (8)$$

$$2.2 < f2/f0 < 2.4 \quad (9)$$

$$-1.2 < f3/f0 <= -1.1 \quad (10)$$

The structure of the second embodiment is also based on the quantity of transfer of the first lens group U1 and the second lens unit group U2, Δd12/Δd23=0.37. It is preferred that it satisfies the following conditions (11):

$$0.36 < d12/\Delta d23 < 0.38 \quad (11)$$

When the conditions (11) are fulfilled, the second lens unit group can be moved in a linear relationship with the first lens group, and the cam of the lens barrel can take a straight line shape.

The present invention can of course be embodied in various forms, without departing from the spirit or the main feature. Modifications or changes in the scope of the invention or equivalents thereto are all within the scope of the invention.

What is claimed is:

1. A projection lens comprising:

a first lens group;

a second lens group; and a third lens group, each of said first, second and third lens groups comprising one or more lens units, wherein said first lens group and said second lens group are independently movable relative to one another and said third lens group so as to allow for focusing, said projection lens as a whole having an aperture ratio of 1:1.1, and said projection lens as a whole having a magnification of projection in a range of –0.025 to –0.100.

2. The projection lens according to claim 1, wherein said first lens group has a positive optical power, said second lens group has a negative optical power and said third lens group has a negative optical power, said first lens group and second lens group being movable in the same direction for different distances so as to allow for focusing of said projection lens, said third lens group being fixed, the ratio of the focal length of said first lens group to the focal length of said projection lens as a whole being in a range of 0.7 to 0.8, the ratio of the focal length of said second lens group to the focal length of said projection lens as a whole being in a range of –3.3 to –3.1, and the ratio of the focal length of said third lens group to the focal length of said projection lens as a whole being in a range of –1.2 to –1.0.

3. The projection lens according to claim 2, wherein the ratio of the distance between said first lens group and said second lens group to the distance between said second lens group and said third lens group is in a range 0.17 to 0.15.

4. The projection lens according to claim 2, wherein said first lens group comprises an aspheric positive lens, a negative lens, a first positive lens and a second positive lens, disposed in the order from a screen end, said second lens group comprises a negative lens and an aspheric positive lens, disposed in the order from said screen end, and said third lens group comprises an aspheric negative lens disposed at said screen end;

the ratio of the focal length of said first lens group to the focal length of the negative lens in said first lens group being in a range –1.9 to –1.7, and the ratio of the focal length of said second lens group to the focal length of the negative lens in said second lens group being in a range 0.38 to 0.040.

5. The projection lens according to claim 4, wherein the aspheric lens in said second lens group and the aspheric lens in said third lens group comprise plastic lens, and the ratio of the focal length of the aspheric lens in said second lens group to the focal length of the aspheric lens in said third lens group being in a range –2.07 to –1.87.

6. The projection lens according to claim 1, wherein said first lens group has a positive optical power, said second lens group has a positive optical power and said third lens group has a negative optical power, said first, second and third lens groups being disposed in the order from a screen end;

said first lens group and second lens group being movable in the same direction for different distances, said third lens group being fixed, the ratio of the focal length of said first lens group to the focal length of said projection lens as a whole being in a range of 1.1 to 1.2, the ratio of the focal length of said second lens group to the focal length of said projection lens as a whole being in a range of 2.2 to 2.4, and the ratio of the focal length of said third lens group to the focal length of said projection lens as a whole being in a range of –1.2 to –1.1.

7. The projection lens according to claim 6, wherein the ratio of the distance between said first lens group and said second lens group to the distance between said second lens group and said third lens group is in a range of 0.36 to 0.38.

* * * * *